United States Patent [19]

Hildebrandt et al.

[11] 4,240,001
[45] Dec. 16, 1980

[54] MOTOR STARTING SWITCH

[75] Inventors: Eugene F. Hildebrandt, Ferguson; Thomas V. Ottersbach, Normandy; Wayne J. DeVries, St. Louis, all of Mo.

[73] Assignee: Emerson Electric Co., St. Louis, Mo.

[21] Appl. No.: 938,455

[22] Filed: Aug. 31, 1978

[51] Int. Cl.³ .................................... H02K 11/00
[52] U.S. Cl. .......................... 310/68 E; 200/80 R; 318/793
[58] Field of Search ............. 318/462, 793; 310/68 E; 200/153 G, 153 L, 153 LA, 153 V, 153 R, 335, 336, 337, 246, 80 R

[56] References Cited

U.S. PATENT DOCUMENTS

| 2,877,323 | 3/1959 | Naher | 200/80 R |
|---|---|---|---|
| 3,209,093 | 9/1965 | Simpson | 200/80 R |
| 3,381,197 | 4/1968 | Waters | 318/793 |
| 3,609,421 | 9/1971 | Hildebrandt | 310/68 E |
| 3,691,415 | 9/1972 | Hancock | 310/68 E |
| 4,034,173 | 7/1977 | Crow | 200/80 R |

*Primary Examiner*—Gerald P. Tolin
*Attorney, Agent, or Firm*—Polster, Polster and Lucchesi

[57] ABSTRACT

A motor starting switch mountable on an electric motor and actuatable by a centrifugal actuator for energizing the starting winding of the motor during start up of the motor and for deenergizing the starting winding or other circuits upon the motor attaining a desired operating speed. A toggle linkage for operatively connecting the motor starting switch to the centrifugal actuator is included as a part of this motor starting switch, and it includes a slider for opening and closing one or more sets of contacts within the starting switch housing movable in the same direction as the actuator member of the centrifugal actuator, and a lever pivoted to the switch housing and engageable by the centrifugal actuator. The slider is privotally connected to the lever so that upon the centrifugal actuator pivoting the lever, the slider is moved to open or close the contacts.

14 Claims, 6 Drawing Figures

U.S. Patent  Dec. 16, 1980  4,240,001
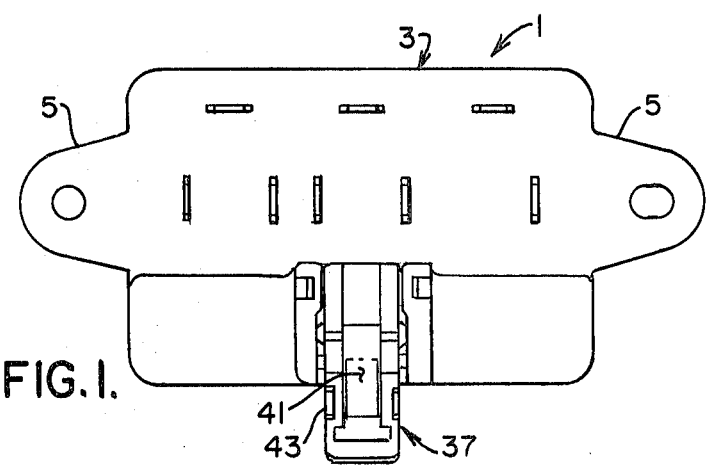
FIG. 1.
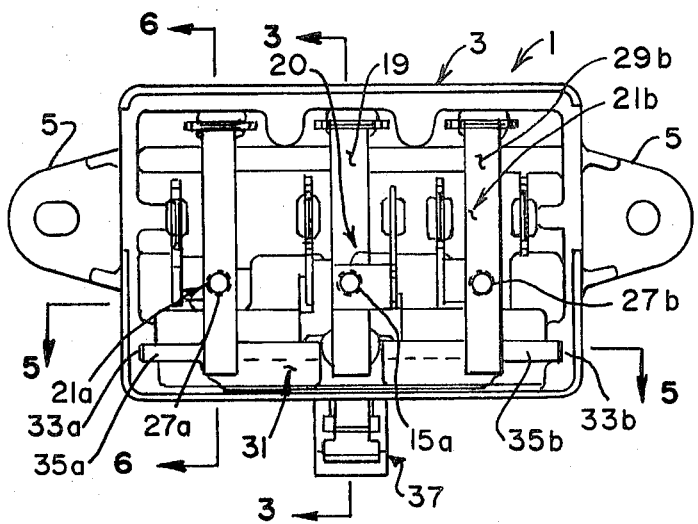
FIG. 2.
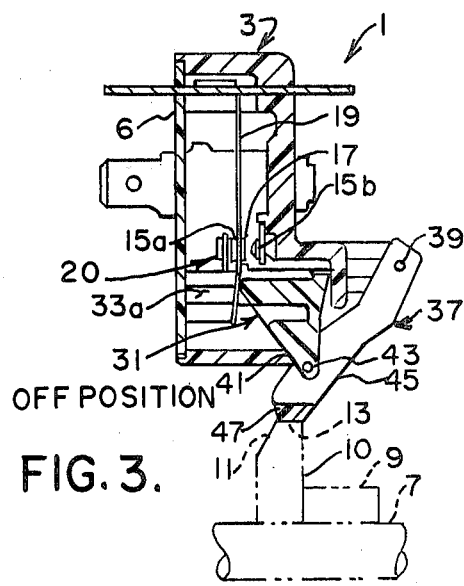
FIG. 3. OFF POSITION
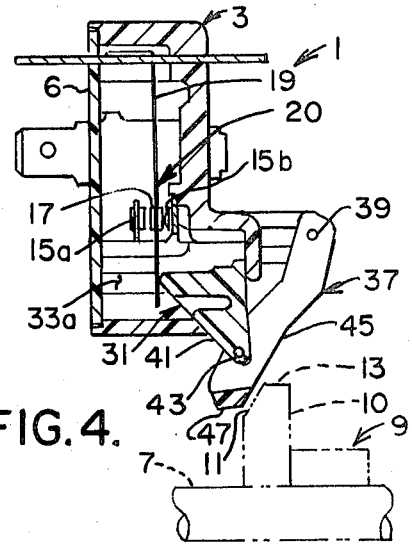
FIG. 4. RUN POSITION
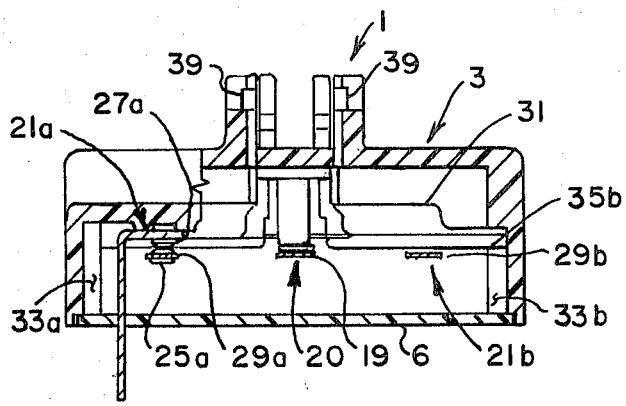
FIG. 5.
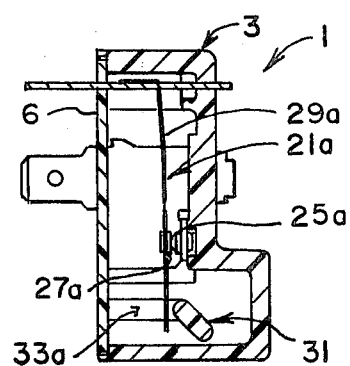
FIG. 6.

MOTOR STARTING SWITCH

BACKGROUND OF THE INVENTION

This invention relates to a motor starting switch for use with an electric motor.

Typically, capacitor start and split phase induction motors have a run winding and a starting winding placed in winding receiving slots provided in the bore of a stator core. The starting winding is energized during start up of the motor (or when the speed of the motor falls below a specified operating speed) so as to create a rotating field in the stator and to apply torque on the rotor for starting the motor. However, once the motor has accelerated to a desired operating speed, (e.g., this speed may be 70 percent or more of the normal operating speed of the motor), the rotor is able to follow the alterations of the magnetic field created by the run windings, and the starting winding no longer is needed. Typically, the starting winding is not intended for continuous use and may fail if not deenergized during normal operation of the motor. As is conventional, a switch, referred to as a motor starting switch, is provided in the motor for energizing the starting winding during start up of the motor and for deenergizing the starting winding once the motor has attained its desired operating speed. These motor starting switches are conventionally actuated by a centrifugal actuator mounted on and rotatable with the rotor shaft of the motor. Centrifugal actuators typically include an actuator member movable axially on the rotor shaft from an off or stop position when the motor is stopped (or operating below a specified operating speed) to a run position upon the motor accelerating to a predetermined operating speed. An actuator linkage operatively interconnects the motor starting switch and the actuator member of the centrifugal actuator. As shown in the co-assigned U.S. Pat. No. 4,034,173, this linkage may include a lever interconnecting the switch and actuator member, a spring, and means for adjusting the lever with respect to the actuator. In some instances, the lever is pivoted on a portion of the motor itself, for example on the end shield of the motor. These parts must of necessity be installed before the motor starting switch has been installed in the motor during manufacture thereof.

Because the actuator member of the centrifugal actuator moves only a limited distance between its off and run positions, it has heretofore been necessary to accurately adjust the relative positions of the motor starting switch and the centrifugal actuator so as to ensure that the former is properly actuated by the centrifugal actuator at a specified motor operating speed. This adjustment of the centrifugal actuator with respect to the motor starting switch is a time consuming operation and thus results at least in part for higher labor costs in manufacture of the motor. To ensure that the motor starting switch of certain motor designs is accurately located with respect to the centrifugal actuator, it has been heretofore necessary to accurately cast a mounting surface for the switch or a linkage pivot point on the end shield of the motor. Of course, the requirement of providing a critical switch mounting surface and the lever pivot point on the end shield adds to the expense of die casting the end shields. In other instances, special brackets rigidly secured to the motor have been provided for mounting of the motor starting switch.

Typically, a centrifugal actuator only exerts a relatively light force on the linkage interconnecting the actuator member and the motor starting switch. With prior linkage arrangements, the force exerted on the linkage was, in some instances, too low the actuate the motor starting switch so as to energize the starting winding of the motor upon subsequent start up of the motor. This condition is sometimes referred to as a "stuck" actuator condition and it prevents the motor from starting.

During the service life of a motor, end play (i.e., axial movement) of the rotor shaft with respect to the end shields (or the frame) of the motor may develop. This end play may be sufficient so as to appreciably change the relative position of the centrifugal actuator mounted on the rotor shaft and the motor starting switch rigidly mounted on the frame or end shield of the motor thus affecting operation of the motor starting switch. Under certain end play conditions, the centrifugal actuator could fail to deenergize the starting winding upon the motor attaining its desired operating speed thus causing the starting winding to fail. Under other end play conditions, the centrifugal actuator may fail to reset the motor starting switch to energize the starting winding upon subsequent start up of the motor and thus the motor would fail to start.

SUMMARY OF THE INVENTION

Among the several objects and features of the present invention may be noted the provision of a motor starting switch, generally as above described, operable by a centrifugal actuator which requires relatively low force to actuate it;

The provision of such a motor starting switch which is relatively insensitive to end play of the rotor shaft and which need not be accurately positioned relative to the centrifugal actuator during manufacture of the motor;

The provision of such a motor starting switch which incorporates the linkage interconnecting the starting switch and the centrifugal actuator so that the motor starting switch and its linkage are installed as a unit on the motor thereby eliminating the requirement of having to separately install the linkage;

The provision of such a motor starting switch which eliminates the need for an accurately cast mounting surface or lever pivot point on the die cast motor end shield;

The provision of such a motor starting switch requiring only a relatively low actuating force to be applied by the centrifugal actuator for actuation;

The provision of such a motor starting switch in which the force applied to the contacts of the starting switch by the centrifugal actuator is limited so as to prevent damage to the contacts; and The provision of such a motor starting switch which is of compact size and of rugged construction, which is reliable in operation, which is easy to install in the motor, and which has a long service life.

Briefly, a motor starting switch of this invention is intended for use on an electric motor which has a shaft rotatable about its longitudinal axis and a centrifugal actuator mounted on this shaft for rotation therewith, the centrifugal actuator having an actuator member movable axially on the shaft between a run position and an off position. The actuator member is movable from its off to its run position upon the shaft rotating at a specified speed and is movable from its run toward its off position upon slowing of the shaft. The actuator member has an actuating surface generally facing toward its off position and another surface contiguous to the actuating surface at the outer end thereof. The motor starting switch comprises a housing adapted to be rigidly mounted with respect to the motor, and at least one set of contacts within the housing including one contact fixed with respect to the housing and another contact movable relative thereto between a closed position in which these contacts are in electrical contact with one another and an open position in which electrical contact therebetween is broken. A slider member is movable within the housing along a line of action generally parallel to the longitudinal axis of the shaft when the housing is mounted on a motor in its normally installed position. A lever is pivotally secured to the housing and has a surface engagable by the actuating surface of the actuator member as the latter moves from its run position toward its off position thereby to effect sliding movement of the slider in one direction in the housing for moving the movable contact from one of its said positions to another. The lever further has a bottom surface contiguous to its inclined surface engageable by the other surface of the actuator member as the latter moves further toward its off position thereby to hold the movable contact of the switch in its above-said one position. Other objects and features of this invention will be in part apparent and in part pointed out hereinafter.

BRIEF DESCRIPTION OF THE DRAWINGS

FIG. 1 is a back side elevational view of a motor starting switch of this invention illustrating the side of the switch adapted to face a centrifugal actuator when the switch is installed in an electric motor;

FIG. 2 is front side elevational view of the motor starting switch with its cover plate removed;

FIG. 3 is a vertical cross sectional view taken along line 3—3 of FIG. 2 illustrating in phantom an actuator member of a centrifugal actuator and showing the contacts of the motor starting switch and the actuator member in their respective relative positions when the motor is off;

FIG. 4 is a view similar to FIG. 3 showing the switch contacts and the actuator member in their respective positions when the motor is running at a predetermined operating speed;

FIG. 5 is a horizontal cross sectional view of the switch taken along line 5—5 of FIG. 2; and FIG. 6 is a vertical cross sectional view of the switch taken along line 6—6 of FIG. 2.

Corresponding reference characters indicate corresponding parts throughout the several views of the drawings.

DESCRIPTION OF A PREFERRED EMBODIMENT

Referring now to the drawings, a motor starting switch of this invention is indicated in its entirety at reference character 1 and it is shown to comprise a housing 3 of molded, synthetic resin material, such as bakelite, which is a good electrical insulator. Housing 3 has a pair of mounting ears 5 for rigidly mounting the starting switch on the end shield or other part of an electric motor. The housing is provided with a removable front cover 6 for enclosing the electrical contacts of the switch. Switch 1 is intended to be mounted in relatively close proximity to a rotor shaft 7 (see FIGS. 3 and 4) of the motor. As is typical, a centrifugal actuator, as generally indicated at 9, is mounted on shaft 7 for rotation therewith. Generally, this actuator may be similar to any one of a number of known centrifugal actuators, such as the actuator shown in the co-assigned U.S. Pat. No. 3,609,421. The centrifugal actuator is mounted on shaft 7 for rotation therewith and has an actuator member 10 movable in axial direction along the shaft from an off position (as shown in FIG. 3) when the motor is stopped (or when it is operating below a specified speed) and a run position (as shown in FIG. 4) when the motor is operated at a predetermined speed. Actuator member 10 as shown to have a conical actuating face 11 facing toward its off position and an outer cylindric face 13 generally parallel to the axis of the rotor shaft and contiguous to the outer edge of the conical face.

As best shown in FIGS. 2-4, a plurality of sets of electrical contacts are provided in switch housing 3. It will be understood, however that only one set of contacts need be provided in a motor starting switch of this invention. In particular, the starting switch illustrated in the drawings has a center contact set including a pair of spaced, fixed contacts 15a and 15b and a movable contact 17 mounted on a resilient, flexible switch arm 19 of spring-like, electrically conductive metal (e.g., beryllium copper or the like) cantilever supported by switch housing 3 and being flexibly movable between the fixed contacts so as to constitute a single pole, double throw switch, as is generally indicated at 20. For example, fixed contact 15a may be connected to the starting winding (not shown) of the motor and switch arm 19 may be connected to a source of power so that upon start up of the motor contacts 15a and 17 effect energization of the starting winding. As best in FIG. 2, motor starting switch 1 further includes a pair of single pole, single throw switches, as generally indicated at 21 and 23. Each of these switches has a respective fixed contact 25a, 25b and a movable contact 27a, 27b carried on a resilient flexible switch arm 29a, 29b cantilever supported from the switch housing for flexible movement toward and away from its fixed contact for making and breaking a circuit. Switch arms 19, 29a and 29b constitute spring means for biasing their respective movable contacts toward a normal or unflexed position in which movable contact 17 is in firm engagement with fixed contact 15b and in which movable contacts 27 are in engagement with their respective fixed contacts 25.

As shown in FIGS. 3 and 4, movable contact 17 and switch arm 19 of switch 20 are movable relative to fixed contacts 15a and 15b between a closed or off position (as shown in FIG. 3) in which contacts 15a and 17 are in electrical contact with one another so as to energize the starting winding of the motor upon start up of the motor and an open or run position (as shown in FIG. 4) in which electrical contact between contacts 15a and 17 is broken thereby to deenergize the starting winding.

A slider member, as generally indicated at 31, is slidably mounted in tracks 33a, 33b provided in housing 3 for sliding along a line of action generally parallel to the longitudinal axis of rotor shaft 7 (i.e., for axial sliding movement) when motor starting switch 1 is mounted on a motor in its normally installed position. As shown, slider 31 is enlongate member preferably molded of a suitable synthetic resin material. It extends from one side of housing 3 to the other and has cylindrical lugs 35a, 35b at each end thereof for reception in respective tracks 33a, 33b. A lever 37 also of synthetic resin material is pivotally secured to housing 3, as indicated at 39, for swinging in a plane including the longitudinal axis of shaft 7 and the line of movement of slider 31. Slider 31 has an integral portion 41 extending downwardly from the rear portion thereof. Portion 41 is shown to be pivotally connected to lever 37, as indicated at 43, at a location intermediate pivot connection 39 and the point on the lever it is engaged by actuator member 10. As best shown in FIG. 1, lever 37 is bifurcated with a slot therein for reception of portion 41 of slider 31. The lever has an inclined surface 45 engageable by conical surface 11 of actuator member 10 as the latter moves from its run position toward its off position for swinging the lever upwardly or counterclockwise (as shown in FIGS. 3 and 4) so as to in turn effect sliding movement of slider 31 in tracks 33a, 33b from rear to front of housing 3 and to effect rotation of the slider relative to the housing about its cylindric lugs 35a, 35b which fit into the tracks. This sliding movement of the slider causes it to engage the outer ends of switch arms 19, 29a and 29b and to flex or bend them so as to close switch 20 (i.e., to bring movable contact 17 into electrical contact with fixed contact 15a) and to open switches 21a and 21b.

Upon continued movement of actuator member 10 toward its off position, inclined surface 45 of lever 37 will ride up conical actuator face 11 of the actuator member so as to effect the above-mentioned swinging movement of the lever. Upon the top of the conical surface engaging the bottom edge of the inclined face of the lever and upon continued axial movement of actuator member 10 toward its off position, the lever will ride up over the intersection between conical face 11 and cylindric face 13 of the actuator member so that a bottom surface 47 of the lever rides on the cylindric surface of the actuator member. Upon the bottom surface of the lever engaging the cylindric surface of the actuator member, no further swinging of the lever occurs and the relative positions of the lever and the slide are maintained fixed so as to in turn hold switch arms 19, 29a and 29b in their flexed positions (as shown in FIG. 3). It will be appreciated that with the flexible resilient switch arms 19, 29a and 29b so flexed, they resiliently bear against the slider and thus constitute means for biasing slider 31 rearwardly in housing 3 toward the its position in the housing it occupies when the actuator member is in its run position. These switch arms further bias lever 37 toward the actuator member 10 and hold it in engagement therewith. Thus, upon movement of actuator member 10 from its off toward its run position, bottom surface 47 of lever 37 will first move clear of cylindric surface 13 of the actuator member, then inclined surface 45 of the lever will bear on conical face 11 of the actuator member, and finally, upon further axial movement of the actuator member toward its run position, the actuator member will move clear of the lever altogether. This of course causes the opening of contacts 15a and 17 and the closing of contacts 15b and 17 of switch 20 and the closing of switches 21a and 21b. With the above-noted contacts and switches closed, the biasing force of switch arms 19a, 29a and 29b on the slider is relaxed thus ensuring that the full force of the flexible switch arms is utilized to keep their respective movable contacts in firm electrical contact with their respective fixed contacts.

In accordance with this invention, it will be noted that lever 37 and slider 31 are preferably moved through their entire path of motion by actuator member 10 during only a portion of the length of axial travel (or stroke) of the actuator member. More specifically, movement of the lever and slider occurs only when inclined face 45 of the lever is in engagement with conical face 11 of the actuator member and when the latter is moving between its run and off positions. It is a particular advantage of motor starting switch 1 of this invention that it does not matter during which portion of the stroke of the actuator member that the inclined face 45 of lever 37 rides on conical face 11 of the actuator member so long as the lever is moved through its full swing. Accordingly, precise positioning and adjustment of motor starting switch 1 on the motor with respect to centrifugal actuator 9 is not required and the motor starting switch of this invention can therefore accommodate relatively large amounts of rotor shaft end play with consequent change of the position of the centrifugal actuator with respect to the motor starting switch without adversely affecting operation of the motor starting switch.

It will also be noted that slider 31 and lever 37 constitute an actuating linkage arrangement operable by the centrifugal actuator. Further, this actuating linkage is mounted on and carried by motor starting switch 1 so that the linkage and the motor starting switch may be installed on a motor in a single operation during manufacture of the motor thus eliminating the necessity of having to install a separate linkage prior to installation of the motor starting switch. Also, slider 31 and its "knee action" motion efficiently moves switch arms 19a, 29a and 29b in an axial direction substantially parallel to the axial direction of the movement of actuator member 10 on rotor shaft 7. Because of the relative locations of slider lugs 35a, 35b and of pivots 39 and 43, the axial force required of the centrifugal actuator to effect movement of the switch arms is quite low in comparison with other known actuator linkages. More specifically, lever 37 and slider 31 constitute a toggle linkage. As actuator member 10 moves from its run position to its off position and engages lever 37, the lever swings upwardly (i.e., clockwise as viewed in FIGS. 2 and 3) thus moving pivot point 43 (also referred to as the knee of the toggle linkage) closer to an imaginary line between lugs 35a, 35b and pivot point 39. As the center or knee pivot moves closer to the above-noted imaginary line, the geometry of the linkage changes and a force greater than the force exerted on the knee of the linkage is exerted on the switch arms. Accordingly, the motor starting switch of this invention is easier to actuate and thus effectively avoids many of the "stuck actuator" malfunctions experienced by other prior art motor starting switches.

It will be understood that a spring, not shown, can be provided within housing 3 to aid switch arms 19, 29a and 29b in biasing slider 31 and lever 37 toward their respective illustrated positions when actuator member 10 is in its run position.

In view of the above, it will be seen that the several objects of the invention are achieved and other advantageous results attained.

As various changes could be made in the above construction without departing from the scope of the invention, it is intended that all matter contained in the above description and shown in the accompanying drawings shall be interpreted as illustrative and not in a limiting sense.

What is claimed is:

1. A motor starting switch and an electric motor, the latter having a shaft rotatable about its longitudinal axis and a centrifugal actuator mounted on said shaft for rotation therewith, said centrifugal actuator having an actuator member movable axially with respect to said shaft between a run position and an off position, said actuator member being movable from its off position to its run position upon said shaft rotating at a predetermined speed and being movable from its run position toward its off position upon slowing of the shaft, said actuator member having an actuating surface generally facing toward its off position and another surface contiguous to said actuating surface, said switch comprising a housing rigidly mounted with respect to said motor, at least one set of contacts within said housing including one contact fixed with respect to said housing and another contact movable with respect thereto between a closed position in which said contacts are in electrical contact with one another and an open position in which electrical contact therebetween is broken, a slider member movable within said housing along a line of action generally parallel to said longitudinal axis of said shaft, a lever pivotally secured to said housing having an inclined surface engageable by said actuating surface of said actuator member as the latter moves from its run toward its off position thereby to effect sliding movement of said slider member in one direction in said housing for moving said movable contact from one of its said positions to another of its said positions and said lever further having a bottom surface contiguous to said inclined surface engageable by said other surface of said actuator member as the latter moves further toward its off position thereby to hold said movable contact in its said other position.

2. A motor starting switch as set forth in claim 1 wherein said housing includes track means slidably receiving said slider member.

3. A motor starting switch as set forth in claim 2 wherein said slider member is pivotally secured to said lever intermediate the pivotal attachment of said lever to said housing and the point on said inclined surface of said lever engageable by said actuator member, said slider member being slidable in said track means and being rotatable with respect to said housing upon pivoting movement of said lever.

4. A motor starting switch as set forth in claim 1 further comprising a flexible, resilient switch arm cantilevered relative to said housing carrying said movable contact, said switch arm having an unflexed position in which said movable contact is in its said one position, said switch arm being engageable by said slider upon movement of said actuator member from its run toward its off position for resiliently flexing said switch arm and for moving said movable contact to its said other position.

5. A motor starting switch as set forth in claim 4 further comprising at least one additional flexible switch arm cantilever supported relative to said housing and engageable by said slider member so that both of said switch arms are resiliently flexed as the slider member is moved within said housing in response to said actuator moving from its run position toward its off position.

6. In a motor starting switch with an electric motor, the latter including a shaft mounted for rotation about its longitudinal axis, a stator having a run winding and a starting winding, a rotor affixed to said shaft and disposed withing said stator for rotation with the shaft, a centrifugal actuator mounted on and rotatable with said shaft, said centrifugal actuator including an actuator member movable axially with respect to said shaft from a first or off position to a second or run position upon said shaft accelerating to a predetermined speed and being reversely axially movable from its run position to its off position upon slowing of the shaft, said starting switch comprising a housing rigidly mounted relative to said motor, a set of contacts connected to said starting winding for energization and deenergization of said starting winding, one of said contacts being fixed relative to said housing and another of said contacts being movable relative to said fixed contact between a closed position in which these contacts are in electrical contact with one another and an open position in which electrical contact between these contacts is broken, wherein the improvement comprises:

a slider member slidably movable within said housing along a line of action generally parallel to the longitudinal axis of said shaft for moving said movable contact between its closed and open positions;

a lever pivotally connected to said housing and engageable by said actuator member of said centrifugal actuator upon movement of said actuator from its off to its run position, said slider member being pivotally connected to said lever for effecting sliding movement of said sliding member so as to in turn effect movement of said movable contact from its closed position to its open position in response to movement of said actuator member from its off position toward its run position; and means for effecting reverse sliding movement of said slider member and for moving said movable contact from its said open position to its closed position in response to movement of said actuator member from its run position to its stop position.

7. In a motor starting switch as set forth in claim 6 wherein said housing includes track means slidably receiving said slider member, said slider member being rotatable with respect to said track means as it is moved therealong by said lever.

8. In a motor starting switch as set forth in claim 7 further comprising a resilient, flexible switch arm carrying said movable contact, said slider member being engageable with said switch arm for moving said movable contact from its closed toward its open position as said slider member slides along said track means in response to pivotal movement of said lever.

9. In a motor starting switch as set forth in claim 8 further comprising a second fixed contact spaced from the first mentioned contact with said switch arm and said movable contact being movable therebetween so as to constitute a single pole, double throw switch.

10. In a motor starting switch as set forth in claim 6 wherein said actuator member has a conical surface facing said lever and an outer cylindrical face, and wherein said lever has an inclined face engageable by said conical face of said actuator member upon axial movement of the latter from its run position toward its off position thereby to effect movement of said movable contact toward its closed position and a bottom surface adapted to ride on said outer cylindrical face of said actuator member upon continued axial sliding movement of said actuator member toward its off position thereby to hold said contacts closed substantially without effecting further pivotal movement of said lever and without effecting further sliding movement of said slider member.

11. In a motor starting switch as set forth in claim 10 wherein said conical face of said actuator member is clear of said lever when said actuator member is in its run position.

12. In an electric motor having a shaft rotatable about its longitudinal axis and a centrifugal actuator mounted on said shaft for rotation therewith, said centrifugal actuator having an actuator member movable axially with respect to said shaft between a run position and an off position, said actuator member being movable from its off position to its run position upon said shaft rotating at a predetermined speed and being movable from its run position toward its off position upon slowing of the shaft, wherein the improvement comprises: a motor starting switch having a housing rigidly mounted with respect to said motor, at least one set of contacts within said housing including one contact fixed with respect to said housing and another contact movable with respect thereto between a closed position in which said contacts are in electrical contact with one another and an open position in which electrical contact therebetween is broken, a flexible, resilient switch arm cantilevered relative to said housing and carrying said movable contact, said switch arm being flexibly movable between an unflexed position and a flexed position for opening and closing said contacts, and a toggle linkage carried by said housing for operatively interconnecting said switch arm to said actuator member of said centrifugal actuator whereby said toggle linkage effects movement of said switch arm from its unflexed to its flexed position in response to movement of said actuator member from its run to its off position and permits said switch arm to return to its unflexed position upon movement of said actuator member from its off to its run position.

13. In an electric motor as set forth in claim 12 wherein said toggle linkage comprises a slider member slidable relative to said housing in a direction generally parallel to the longitudinal axis of said shaft and rotatable with respect to said housing, said slider member being engageable with said switch arm to flex the latter, and a lever pivotally secured to said housing and being engageable by said actuator member as the latter moves from its run to its off position, said slider being pivotally connected to said lever with the pivotal connection between said lever and said slider being referred to as a knee, said knee being movable toward an imaginary line between the portion of said slider slidable on said housing and said pivotal connection of said lever to said housing upon said lever being swung by said actuator member as the latter moves from its run to its off position thereby to effect the application of a force on said switch arm for flexing said switch arm greater than the force said actuator member exerts on said knee.

14. In an electric motor having a shaft rotatable about its longitudinal axis and a centrifugal actuator mounted on said shaft for rotation therewith, said centrifugal actuator having an actuator member movable axially with respect to said shaft between a run position and an off position, said actuator member being movable from its off position to its run position upon acceleration of said shaft to a predetermined speed and being movable from its run position toward its off position upon slowing of the shaft, wherein said improvement comprises: a conical actuating surface on said actuating member generally facing toward the off position of said actuator member and a cylindrical surface contiguous to said actuating surface, and a starting switch comprising a housing rigidly mounted with respect to said motor, at least one set of contacts within said housing including one contact fixed with respect to said housing and another contact movable with respect thereto between a closed position in which said contacts are in electrical contact with one another and an open position in which electrical contact therebetween is broken, a lever pivotally secured to said housing for opening and closing said one set of contacts, said lever being engageable by said conical actuating surface of said actuator member as the latter moves from its run toward its off position for moving said movable contact from one of its said positions to another of its said positions, said lever being further engageable by said cylindrical surface of said actuator member as the latter moves further toward its off position thereby to hold said movable contact in its said other position substantially without applying additional force to said movable contact as said actuator completes its movement to its off position.

* * * * *